United States Patent
Shirai

(10) Patent No.: US 9,120,468 B2
(45) Date of Patent: Sep. 1, 2015

(54) AUXILIARY BRAKING DEVICE OF VEHICLE

(75) Inventor: Masafumi Shirai, Kumagaya (JP)

(73) Assignee: UD TRUCKS CORPORATION, Ageo-shi (JP)

( * ) Notice: Subject to any disclaimer, the term of this patent is extended or adjusted under 35 U.S.C. 154(b) by 26 days.

(21) Appl. No.: 13/885,856

(22) PCT Filed: Oct. 24, 2011

(86) PCT No.: PCT/JP2011/074400
§ 371 (c)(1),
(2), (4) Date: May 16, 2013

(87) PCT Pub. No.: WO2012/070344
PCT Pub. Date: May 31, 2012

(65) Prior Publication Data
US 2013/0245906 A1    Sep. 19, 2013

(30) Foreign Application Priority Data

Nov. 26, 2010  (JP) ................................. 2010-263124

(51) Int. Cl.
*B60T 8/17* (2006.01)
*B60T 7/04* (2006.01)
(Continued)

(52) U.S. Cl.
CPC . *B60T 8/17* (2013.01); *B60T 7/042* (2013.01); *B60T 8/321* (2013.01); *B60W 30/188* (2013.01); *B60W 2510/186* (2013.01); *B60W 2540/10* (2013.01); *F02D 41/0205* (2013.01)

(58) Field of Classification Search
CPC . B60W 10/18; B60W 10/198; B60W 10/196; B60W 30/18109; B60W 30/188; B60T 8/17; B60T 8/321; B60T 7/042

USPC .............................. 701/70, 78, 79, 81, 93, 96
See application file for complete search history.

(56) References Cited

U.S. PATENT DOCUMENTS 5,215,159 A     6/1993   Nishida

FOREIGN PATENT DOCUMENTS

| CN | 1799910 A | 7/2006 |
| EP | 2 127 987 A1 | 2/2009 |

(Continued)

OTHER PUBLICATIONS

Machine Translation of JP 2007-132293 (2007).*

(Continued)

*Primary Examiner* — Thomas Tarcza
*Assistant Examiner* — Kevin Myhre
(74) *Attorney, Agent, or Firm* — Kratz, Quintos & Hanson, LLP

(57) ABSTRACT

The purpose of the present invention is to provide an auxiliary braking device of a vehicle which obtains braking force corresponding to the amount of pressing of an accelerator pedal even during an operation of the auxiliary braking device and prevents frequent repetition of the acceleration and deceleration, to attain a fuel saving operation. Therefore, in the present invention, a vehicle electronic control unit (10) and other electronic control units (20, 30) are provided, the vehicle electronic control unit (10) and the other electronic control units are connected with each other by an in-vehicle communication system (L123), and an auxiliary brake switch position detection device (5S) that detects a switch position of an auxiliary brake switch (5) and an accelerator pedal pressing amount measurement device (4S) that measures the amount of pressing of the accelerator pedal (4) are provided.

2 Claims, 3 Drawing Sheets

(51) Int. Cl.
    *B60T 8/32*     (2006.01)
    *B60W 30/188*     (2012.01)
    *F02D 41/02*     (2006.01)

(56) References Cited

FOREIGN PATENT DOCUMENTS

| | | |
|---|---|---|
| EP | 2 210 761 A1 | 7/2010 |
| JP | S59-119418 | 7/1984 |
| JP | H2-258462 | 10/1990 |
| JP | H7-101325 | 4/1995 |
| JP | H8-282329 | 10/1996 |
| JP | 2000-35114 | 2/2000 |
| JP | 2004-26064 A1 | 1/2004 |
| JP | 2005-271637 A1 | 10/2005 |
| JP | 2007-132293 A1 | 5/2007 |

OTHER PUBLICATIONS

Machine Translation of JP 2005-271637 (2005).*
Machine Translation of JP 2004-026064 (2004).*
Machine translation of Torimoto (JP 07-101325) (1995).*
International Search Report for International Application No. PCT/JP2011/07440 dated Nov. 15, 2011.
Extended European Search Report dated Feb. 16, 2015.

* cited by examiner

AUXILIARY BRAKING DEVICE OF VEHICLE

TECHNICAL FIELD

The present invention relates to an auxiliary braking device of a vehicle. More particularly, the present invention relates to at least one of an exhaust brake of an engine and a retarder for obtaining a braking force by a generator set on a propeller shaft.

BACKGROUND ART

Various auxiliary braking devices have been proposed (See Patent Literature 1 and Patent Literature 2, for example).

Patent Literature 1 and Patent Literature 2 are both constructed such that the auxiliary braking device is not operated during an operation of an accelerator pedal (See FIG. 5).

Therefore, according to such auxiliary braking device, if the accelerator pedal is pressed while the auxiliary braking device is operating, a vehicle stops braking and changes to an acceleration state instantly from a deceleration state, and a shock occurs in the vehicle.

In the vehicle provided with the auxiliary braking device with such constructions, repetition of acceleration/deceleration increases, a frequency of coasting decreases and a fuel consumption of the vehicle deteriorates on a flat road when an inter-vehicle distance to a preceding vehicle frequently increases/decreases while following the preceding vehicle or on a road in mountains with continuous ups and downs.

Since acceleration/deceleration increase, shifting up and shifting will be repeated in a vehicle provided with an automatic transmission, which might give a sense of discomfort to a driver.

CITATION LIST

Patent Literature

Patent Literature 1: Japanese Patent Application Non-examined Publication Gazette No. H08-282329
Patent Literature 2: Japanese Patent Application Non-examined Publication Gazette No. 2000-35114

SUMMARY OF INVENTION

Technical Problem

The present invention was proposed in view of the above described prior art problems and has an object to provide an auxiliary braking device of a vehicle which can obtain a braking force according to an amount of pressing of an accelerator pedal even during an operation of the auxiliary braking device, so as to prevent frequent repetition of acceleration and deceleration and to realize a fuel saving operation.

Solution to Problem

An auxiliary braking device (100) of a vehicle of the present invention has a vehicle electronic control unit (vehicle ECU 10) and other electronic control units (ECU: an engine ECU 20, a retarder ECU 30, a transmission ECU and the like, for example), and the vehicle electronic control unit (10) and the other electronic control units (20, 30) are connected by an in-vehicle communication system (so-called "CAN communication" L123, for example), an auxiliary brake switch position detection device (5S) for detecting a switch position of an auxiliary brake switch (5) and an accelerator pedal pressing amount measurement device (accelerator opening sensor 4S) for measuring an amount of pressing of an accelerator pedal (4) (as a voltage of the accelerator pedal) are provided, the vehicle electronic control unit (10) is provided with a storage device (14) storing characteristics of the amount of pressing the accelerator pedal and the auxiliary braking force, the vehicle electronic control unit has a function for determining the auxiliary braking force corresponding to the amount of pressing the accelerator pedal (4) in correspondence with the characteristics stored in the storage device (14), if the accelerator pedal (4) is pressed when an auxiliary braking device (3) is operated by the auxiliary brake switch (5) and a function for transmitting the determined auxiliary braking force to the other electronic control units (20, 30) are provided.

In the present invention, the characteristics of the amount of pressing the accelerator pedal (4) and the auxiliary braking force stored in the storage device (14) are preferably different at each switch position of the auxiliary brake switch (5).

In the present invention, the auxiliary braking device (100) of a vehicle is preferably at least one of an exhaust brake of the engine and a retarder (3) for obtaining the braking force by a generator set on a propeller shaft.

Advantageous Effects of Invention

According to the present invention provided with the above described constructions, if the accelerator pedal (4) is pressed when the auxiliary braking device (100) is operating, the auxiliary braking force corresponding to the amount of pressing the accelerator pedal (4) is determined and it is transmitted to the electronic control units (20, 30) other than the vehicle electronic control unit (10).

Thus, even if the accelerator pedal (4) is pressed when the auxiliary braking device (100) is operating, the state does not immediately change to an acceleration state as in the prior art, but the auxiliary braking force corresponding to the accelerator pedal (4) works.

Thus, rapid acceleration or occurrence of a shock in the vehicle caused by that as in the prior art can be prevented.

Moreover, if the amount of pressing the accelerator pedal (4) is decreased while the auxiliary braking device is operating, the auxiliary braking force increases in accordance with that. There is no need as in the prior art to return the accelerator pedal until the accelerator pedal opening becomes zero in order to operate the auxiliary braking force.

As a result, it is no longer necessary to repeat pressing of the accelerator pedal (4) and returning it until the opening becomes zero. Thus, as compared with the prior art, acceleration/decoration of the vehicle become gentle and frequencies of acceleration/deceleration decrease and fuel consumption is improved.

Moreover, since acceleration/deceleration become gentle, repetition of shift-up/shift-down in a vehicle having an automatic transmission is prevented.

DESCRIPTION OF EMBODIMENTS

An embodiment of the present invention will be described below by referring to the attached drawings.

Figure 1:
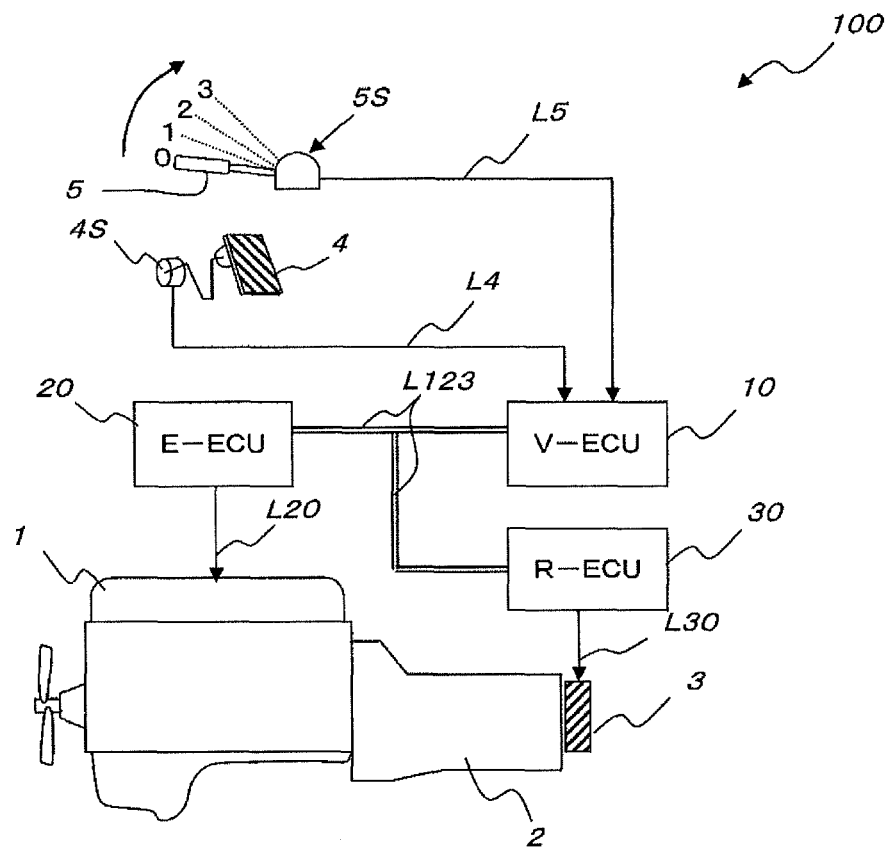
FIG. 1 is a block diagram illustrating a construction of an auxiliary braking device of a vehicle according to an embodiment of the present invention.

FIG. 1 shows a construction of an auxiliary braking device of a vehicle generally indicated by reference numeral 100.

In FIG. 1, in a vehicle having an engine 1, a transmission 2 and a retarder 3, the auxiliary braking device 100 of a vehicle is provided with an accelerator opening sensor 4S, an auxiliary brake switch position detection device 5S, a vehicle control unit 10, an engine controller 20, and a retarder controller 30.

It is possible to select an exhaust brake other than the retarder 3 for the auxiliary braking device main body.

The accelerator opening sensor 4S is attached to be engaged with an accelerator pedal 4 and transmits a voltage signal of intensity according to accelerator opening to the control unit (hereinafter referred to as a "control unit") 10 by a line L4.

The auxiliary brake switch position detection device (hereinafter referred to as an "auxiliary brake position sensor") 5S is constructed to be engaged with an auxiliary brake lever 5 whose intensity of an auxiliary braking force (degree of effect) can be switched in four stages so as to detect a position of the four stages.

The auxiliary brake position sensor 5S transmits information of the current position to the control unit 10 by a line L5.

The control unit 10, the engine controller 20, and the retarder controller 30 are connected to each other by an in-vehicle communication system (so-called "CAN communication", for example) L123.

The engine controller 20 is connected to a fuel injection device, not shown, by a line L20 and is constructed to control a fuel injection amount of the fuel injection device in accordance with a control signal transmitted by the control unit 10.

The retarder controller 30 is connected to the retarder 3 by a line L30 and is constructed to adjust a braking force (power generation amount) of the retarder 3 in accordance with the control signal transmitted by the control unit 10.

Figure 2:
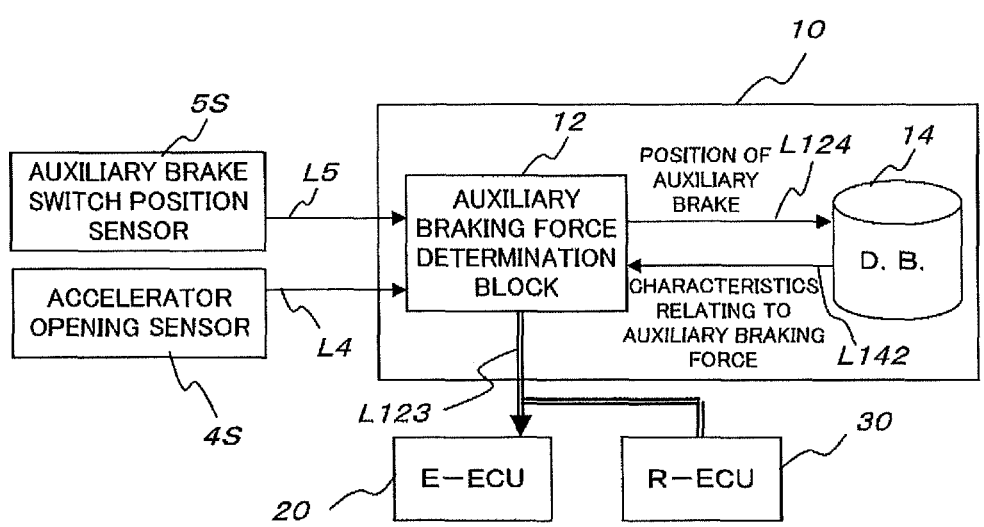
FIG. 2 is a block diagram illustrating a construction of a vehicle electronic control unit according to an embodiment and relevance between the vehicle electronic control unit and sensors and retarders.

FIG. 2 shows constructions of the control unit 10 and a relationship among the control unit 10, the accelerator opening sensor 4S, the auxiliary brake position sensor 5S, the engine controller 20, and the retarder controller 30.

In FIG. 2, the control unit 10 is provided with an auxiliary braking force determination block 12 and a database 14 as storage means.

The auxiliary braking force determination block 12 and the database 14 are connected by a line L124 and a line L142. It is constructed such that a position of the auxiliary brake is sent from the auxiliary braking force determination block 12 to the database 14 by the line L124, while characteristics relating to the auxiliary braking force corresponding to the position are sent back from the database 14 to the auxiliary braking force determination block 12 by the line L142.

The auxiliary braking force determination block 12 determines the auxiliary braking force from the accelerator opening information from the accelerator opening sensor 4S obtained by the line L4, auxiliary braking force information from the auxiliary brake position sensor 5S obtained by the line L5, and characteristic diagrams (See FIG. 3) stored in the database 14.

Then, the auxiliary braking force determination block 12 sends a control signal for generating the auxiliary braking force determined in the auxiliary braking force determination block 12 to the retarder controller 30. Alternatively, the control signal is sent to the engine controller 20 in order to keep the driving force in a proper value at that time.

Figure 5:
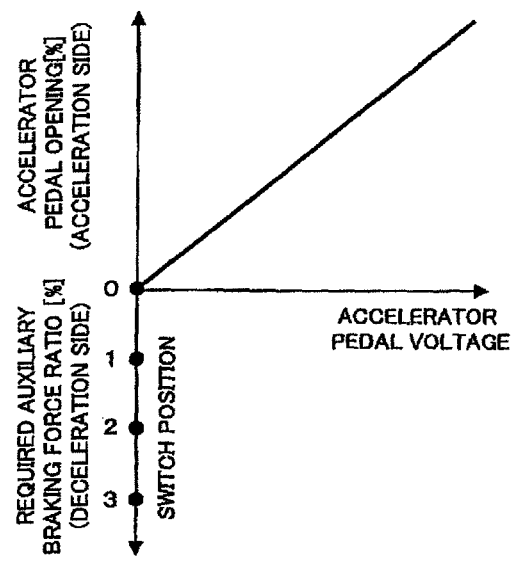
FIG. 5 is a characteristic diagram illustrating a relationship between an accelerator pedal voltage and an accelerator opening as well as a required braking force ratio in a prior art.

Here, FIG. 5 shows four positions (switch positions 0, 1, 2, and 3) provided in the auxiliary brake position sensor and a ratio of a required auxiliary braking force at each position (lower region in FIG. 5) over the characteristic diagram illustrating a relationship between the accelerator pedal opening and the accelerator pedal voltage in the prior art (upper region in FIG. 5) in an overlapping manner.

As shown in FIG. 5, the prior art is constructed such that the auxiliary braking force is not generated when the accelerator pedal is pressed.

Figure 6:
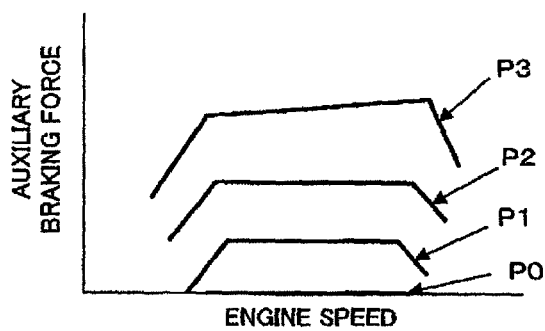
FIG. 6 is a characteristic diagram illustrating a relationship between an engine speed and the auxiliary braking force in the prior art.

Moreover, the braking force at the four switch positions (0 to 4) are substantially constant in each of the line diagrams regardless of the engine speed as shown in a line diagram (P0, P1 to P3) in FIG. 6.

Figure 3:
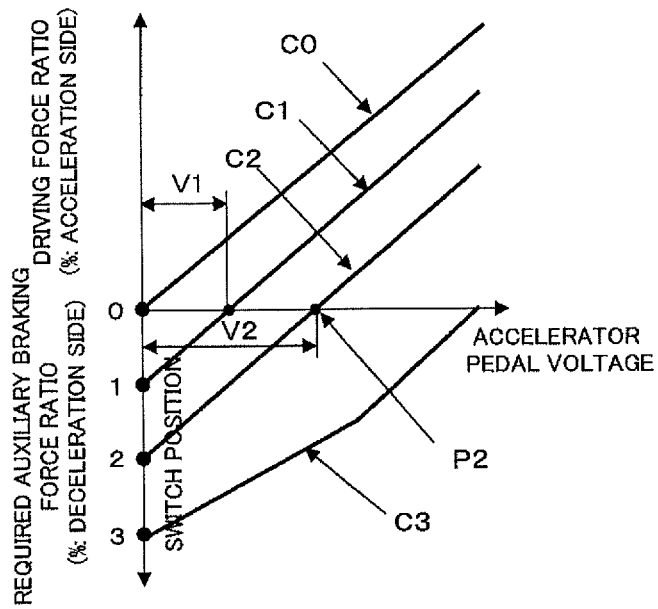
FIG. 3 is a characteristic diagram illustrating a relationship among an accelerator pedal voltage, a braking force and a driving force in order to acquire an auxiliary braking force.

On the other hand, in the auxiliary braking device 100 in this embodiment, the braking force of the auxiliary braking is determined by the characteristic diagram in FIG. 3.

In FIG. 3, intensity of the accelerator pedal voltage (in proportion to the accelerator opening) is marked on the lateral axis, while a ratio of the required auxiliary braking force or the driving force is marked on the vertical axis.

If the position of the auxiliary braking lever is 0 (during normal running), as shown in a line diagram C0, the auxiliary braking is non-operating. Therefore, the driving force (acceleration side) increases in proportion to the amount of pressing the accelerator pedal (accelerator pedal voltage).

Thus, according to the embodiment shown in the drawings, it is possible to set the braking force with respect to the engine speed so that it is located in an intermediate region of the line diagrams P0 and P1 to P3 in FIG. 6.

The example in FIG. 3 is constructed such that the braking force increases in the same proportion as the position number (1, 2, and 3) of the auxiliary braking lever 5 increases.

In FIG. 3, it is known that, if the position 2 (the line diagram C2) is selected, the driving force effecting acceleration cannot be obtained until the accelerator pedal 4 is pressed from the start of pressing until V2 (P2 point) is reached in voltage value conversion of the accelerator pedal.

Moreover, if the position 1 (the line diagram C) is selected, the vehicle changes from deceleration to acceleration with a not-so-large accelerator pedal pressing amount (V1 in voltage value conversion of the accelerator pedal).

In FIG. 3, the line diagram C3 is a braking force characteristic when the position 3 is selected.

Subsequently, a method of determining the auxiliary braking force will be described on the basis of a flowchart in FIG. 4 and also by referring to FIG. 1.

Figure 4:
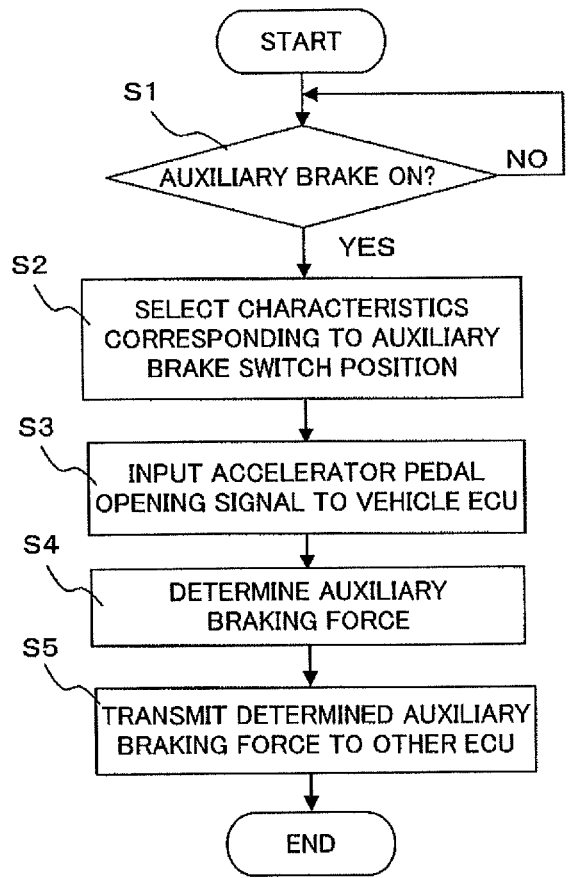
FIG. 4 is a flowchart illustrating control for determining the auxiliary braking force according to the embodiment.

At Step S1 in FIG. 4, the control unit 10 stands by until the auxiliary brake starts operation (loop at Step S1).

If the auxiliary brake starts to operate (YES at Step S1), the routine proceeds to Step S2, and the control unit 10 selects a characteristic corresponding to an auxiliary brake position (position of the auxiliary brake lever 5) from the characteristic diagram in FIG. 3 on the basis of the information from the auxiliary brake position sensor 5S.

At the subsequent Step S3, the control unit 10 obtains an accelerator pedal opening signal on the basis of the information from the accelerator opening sensor 4S. Then, the appropriate auxiliary braking force is determined at Step S4 by referring to the data in the database 14, that is, from the characteristic diagram in FIG. 3. Then, information of the determined auxiliary braking force and a fuel injection amount relating to that is sent to the retarder controller 30 and the engine controller 20 (Step S5).

According to the embodiment shown in the drawings, if the accelerator pedal 4 is pressed while the retarder 3 is operating, the auxiliary braking force corresponding to the amount of pressing the accelerator pedal 4 is determined and sent to the retarder controller 30 and the engine controller.

Thus, even if the accelerator pedal 4 is pressed while the retarder 3 is operating, the state does not immediately change to an acceleration state as in the prior art, but the auxiliary braking force corresponding to the accelerator pedal 4 works.

Thus, rapid acceleration or occurrence of a shock in the vehicle caused by that as in the prior art can be prevented.

Moreover, if the amount of pressing the accelerator pedal 4 is decreased while the retarder 3 is operating, the auxiliary braking force increases in correspondence with that. It is not necessary to return the accelerator pedal until the accelerator pedal opening becomes zero in order to operate the auxiliary braking force as in the prior art.

As a result, it is no longer necessary to repeat pressing of the accelerator pedal 4 and returning it until the opening becomes zero. Thus, as compared with the prior art, acceleration/deceleration of the vehicle become gentle and frequencies of acceleration/deceleration decrease and fuel consumption can be improved.

Moreover, since acceleration/deceleration become gentle, repetition of shift-up/shift-down in a vehicle having an automatic transmission is prevented.

The embodiment shown in the drawings is only exemplification and the description is not intended to limit the technical scope of the present invention.

In the embodiment shown by the drawings, in the characteristic diagram in FIG. 3, the line diagram C3 is constituted as non-linear. That is, even if the accelerator pedal is pressed, the auxiliary braking force is not largely decreased until the pressing amount reaches a predetermined amount but decrease of the auxiliary braking force is expedited at that amount or more.

The line diagram C3 may have a linear characteristic as in the line diagrams C1 and C2. On the contrary, all the line diagrams C1 to C3 may have non-linear characteristics.

REFERENCE SIGNS LIST 1 engine
2 transmission
3 retarder
4S accelerator opening sensor
5S auxiliary brake switch position detection device/auxiliary brake position sensor
10 vehicle ECU/control unit
12 auxiliary braking force determination block
14 storage device/database
20 engine ECU/engine controller
30 retarder ECU/retarder controller

The invention claimed is:

1. An auxiliary braking device of a vehicle, comprising:
a vehicle electronic control unit and other electronic control units, in which the vehicle electronic control unit and the other electronic control units are connected by an in-vehicle communication system, an auxiliary brake switch position detection device for detecting at least three switch positions of an auxiliary brake switch and an accelerator pedal pressing amount measurement device for measuring an amount of pressing of an accelerator pedal are provided,
the vehicle electronic control unit is provided with a storage device storing characteristics of the amount of pressing the accelerator pedal and the auxiliary braking force;
the vehicle electronic control unit has a function for determining the auxiliary braking force corresponding to the amount of pressing the accelerator pedal in correspondence with the characteristics stored in said storage device, if the accelerator pedal is pressed when an auxiliary braking device is operated by the auxiliary brake switch, and
a function for transmitting the determined auxiliary braking force to the other electronic control units are provided,
wherein the characteristics of the amount of pressing the accelerator pedal and the auxiliary braking force stored in said storage device are different at each of the at least three switch positions of the auxiliary brake switch,
wherein each of the characteristics of the amount of pressing the accelerator pedal and the auxiliary braking force stored in said storage device at each of the at least three switch positions of the auxiliary brake switch is a non-constant function relating the auxiliary braking force to the amount of pressing the accelerator pedal,
wherein at least one of the non-constant functions relating the auxiliary braking force to the amount of pressing the accelerator pedal is a non-linear function which has at least a first section and a second section, the first section corresponding to a lesser amount of pressing the accelerator pedal relative to the second section, and
wherein the slope of the at least one non-linear function is defined as the change in auxiliary braking force divided by the change in the amount of pressing the accelerator pedal, and the slope of the first section is lower than the slope of the second section.

2. The auxiliary braking device of a vehicle according to claim 1, wherein at least one of the non-constant functions can be configured to be one of linear and non-linear.

* * * * *